United States Patent
Kim et al.

(10) Patent No.: US 8,059,534 B2
(45) Date of Patent: Nov. 15, 2011

(54) METHOD OF PERFORMING SCHEDULING IN A WIRED OR WIRELESS COMMUNICATION SYSTEM AND APPARATUS THEREOF

(75) Inventors: Beom Joon Kim, Seoul (KR); Min Seok Oh, Seoul (KR); Hyang Won Lee, Daejeon (KR); Song Chong, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 348 days.

(21) Appl. No.: 12/296,061

(22) PCT Filed: Apr. 3, 2007

(86) PCT No.: PCT/KR2007/001620
§ 371 (c)(1),
(2), (4) Date: Apr. 17, 2009

(87) PCT Pub. No.: WO2007/114633
PCT Pub. Date: Oct. 11, 2007

(65) Prior Publication Data
US 2009/0298510 A1 Dec. 3, 2009

(30) Foreign Application Priority Data

Apr. 3, 2006 (KR) .................. 10-2006-0030307
Apr. 3, 2006 (KR) .................. 10-2006-0030308

(51) Int. Cl.
*H04L 12/28* (2006.01)
(52) U.S. Cl. ........ 370/230; 370/252; 370/437; 370/468; 455/450
(58) Field of Classification Search ............. 370/347, 370/342, 335, 395, 41, 230, 236, 468, 412, 370/437, 416, 336, 240, 252, 310, 395.2, 370/477; 455/67.11, 67.7, 450, 453, 513, 455/517, 560, 451, 455.2; 709/226, 240, 709/235, 224
See application file for complete search history.

(56) References Cited

U.S. PATENT DOCUMENTS

| | | | | |
|---|---|---|---|---|
| 6,055,571 A * | 4/2000 | Fulp et al. | ...................... | 709/224 |
| 6,141,323 A * | 10/2000 | Rusu et al. | ..................... | 370/236 |
| 2002/0147022 A1* | 10/2002 | Subramanian et al. | ....... | 455/453 |
| 2003/0009560 A1* | 1/2003 | Venkitaraman et al. | ...... | 709/226 |
| 2003/0067935 A1* | 4/2003 | Hosein | .......................... | 370/437 |
| 2003/0104817 A1* | 6/2003 | Damnjanovic | ................ | 455/452 |
| 2004/0082363 A1* | 4/2004 | Hosein | .......................... | 455/560 |
| 2004/0120290 A1* | 6/2004 | Makhijani et al. | ............. | 370/335 |
| 2004/0264500 A1* | 12/2004 | Bansal et al. | ................ | 370/468 |
| 2005/0111361 A1* | 5/2005 | Hosein | .......................... | 370/230 |
| 2005/0259623 A1* | 11/2005 | Garudadri et al. | ............ | 370/335 |
| 2006/0242319 A1* | 10/2006 | Sang et al. | ..................... | 709/240 |
| 2007/0026808 A1* | 2/2007 | Love et al. | ..................... | 455/67.7 |
| 2007/0133407 A1* | 6/2007 | Choi et al. | ..................... | 370/230 |
| 2008/0095124 A1* | 4/2008 | Ramos et al. | ................. | 370/336 |

FOREIGN PATENT DOCUMENTS

| | | |
|---|---|---|
| EP | 1447938 A2 | 8/2004 |
| EP | 1469641 A2 | 10/2004 |
| KR | 20030049531 | 6/2003 |
| WO | 2007/103615 A2 | 9/2007 |

* cited by examiner

*Primary Examiner* — Aung S Moe
*Assistant Examiner* — Abdullah Riyami
(74) *Attorney, Agent, or Firm* — Lee, Hong, Degerman, Kang & Waimey

(57) ABSTRACT

A method of performing scheduling and a method of controlling call admission in a communication system are disclosed. A method of controlling call admission a new user equipment which enters a network in a communication system includes performing scheduling by giving priority lower than that of a user equipment which is previously receiving a service to the new user equipment, and determining whether to admit call of the new user equipment depending a result of scheduling for a certain time period.

10 Claims, 10 Drawing Sheets

METHOD OF PERFORMING SCHEDULING IN A WIRED OR WIRELESS COMMUNICATION SYSTEM AND APPARATUS THEREOF

TECHNICAL FIELD

The present invention relates to a wired or wireless communication system, and more particularly, to a method of performing scheduling in a communication system, a method of controlling call admission, and an apparatus thereof.

BACKGROUND ART

In a communication system, scheduling can be used in various meanings and mainly relates to efficient distribution of limited resources. For example, in case of uplink, scheduling is to determine as to when to transmit data through which user equipment using which channel resources (code, frequency, time, power, data rate, etc.). In case of downlink, scheduling is to determine as to whether a network provides services to which one of a plurality of user equipments for a specific time period at what level of Quality of Service (QoS), wherein the plurality of user equipments are receiving a specific service.

In downlink scheduling according to the related art, on the assumption that QoS requirements of all users are satisfied owing to sufficient network resource, there are provided scheduling algorithms that can satisfy the above requirements. However, since the network resource is not always sufficient, QoS requirements of all users are not always satisfied. Accordingly, it is necessary to consider what requirements for satisfying QoS of the users are under the circumstances that the network resource is not sufficient.

Furthermore, in order to actually realize and operate the scheduling algorithms at a desired level, it is necessary to determine as to whether QoS requirements of all users can be satisfied even in the case that a user who newly desires to enter a network is admitted to enter the network. If QoS requirements of all users are satisfied, the new user is admitted to enter the network. If not so, an action which does not admit network entrance of the new user is necessarily required. This is referred to as call admission control (CAC). A call admission control algorithm which is operated along with the scheduling algorithm has not been suggested until now.

However, the call admission control algorithm does not solve every problem due to time variable characteristics in resources of a radio channel. In other words, even though the call admission control algorithm determines that a user who newly arrives in the network is admitted to enter the network, a problem occurs in that the current status may be varied to the status where the user is not admitted to enter the network, as the time passes. However, the conventional scheduling algorithms fail to suggest preparations for the above problem.

Finally, a problem occurs in that the conventional scheduling algorithms do not handle as to how to use remaining resources after ensuring QoS of users. For this reason, this problem could lead to serious waste of radio resources under the circumstances that various types of QoS should be ensured.

DISCLOSURE OF THE INVENTION

Accordingly, the present invention is directed to a method of performing scheduling in a communication system, which substantially obviates one or more problems due to limitations and disadvantages of the related art.

An object of the present invention is to provide a method of performing scheduling in a communication system, which can maximize satisfaction of users who use a service of the communication system.

Another object of the present invention is to provide a method of performing scheduling in a communication system, which can efficiently distribute network resources remaining after ensuring QoS of all users.

Still another object of the present invention is to provide a method of controlling call admission considering a scheduling algorithm.

Further still another object of the present invention is to provide a method of controlling call admission in a communication system, which can admit a specific user to newly enter a network within a range that QoS of existing users who use a service is ensured.

To achieve these objects and other advantages and in accordance with the purpose of the invention, as embodied and broadly described herein, the present invention provides a method of performing scheduling based on a utility maximization problem and an average throughput utility function. The utility function is defined for each user, and is defined respectively for users who request different types of QoS depending on service types. The utility function is defined for users, who have different priorities, at different parameters.

Preferably, the utility function for each user is strictly concave. A network side (for example, a scheduler of a base station) selects a user, who will be given a service per certain time period (for example, per time slot), by using the utility function for each user. For maximization of the utility function, the network side may select a user, who will be given a service, depending on each utility value calculated based on the utility function of each user. An example of the utility value can be calculated by a multiplication (hereinafter, referred to as "decision metric") of a data rate that can currently be achieved and a differential value of the utility function. For maximization of the utility function, the network side may select a user who has the greatest decision metric.

A utility function for each user should be determined to enable efficient scheduling. According to one feature of the utility function of the present invention, the priority of each user is reflected in a differential height of the utility function. In other words, the utility function is set such that a user whose priority is high has a high differential and a user whose priority is low has a low differential. In this way, the network side may allow the user whose priority is high to be first selected when selecting the user who will be given a service. The priority for each user can be determined freely considering at least one of a billing system, service types, and policies of other network providers.

According to another feature of the utility function of the present invention, a differential value of each user is varied depending on service types provided to each user. For example, a utility function of a constant bit rate (CBR) user who requires a minimum average data transmission rate has a differential value different from that of a utility function of an elastic with minimum guarantee (EMG) user who not only requires the minimum average data transmission rate but also desires to receive data at a transmission rate greater than the minimum average data transmission rate if possible.

More specifically, the utility function of the CBR user is preferably set in such a manner that a differential value of the utility function of the CBR user equipment is rapidly decreased to 0 when an average transmission rate of the CBR user exceeds the minimum average data transmission rate while a differential value of the utility function of an elastic with minimum guarantee (EMG) user is rapidly decreased when the average transmission rate of the EMG user exceeds the minimum average data transmission rate but is slowly decreased when the average transmission rate of the EMG user reaches a certain value or less. When the utility function is selected as above, the decision metric of the CBR user is decreased to 0 if the average transmission rate exceeds the minimum average data transmission rate, thereby resulting in that the CBR user is not selected any longer when scheduling is performed. After all, the CBR user receives only data of the minimum average data transmission rate. On the other hand, the EMG user may be selected by the scheduler as the differential value of the EMG user does not reach 0 even though the minimum average data transmission rate has been achieved. Considering the priority described as above, the minimum average data transmission rate is satisfied starting from the user having the highest priority, i.e., the user whose utility function has the highest differential height. Subsequently, the minimum average data transmission rate is satisfied in the order of priority.

The differential value of the utility function of the user who newly enters the network is set such that the user has the lowest priority. In this way, if the utility function is set, minimum performance of the existing users, which is to be ensured, is not affected even by measurement based call admission control. In other words, even though the user who newly desires to enter the network is admitted to enter the network, it does not affect ensuring minimum performance of the existing users.

In one aspect of the present invention, a method of performing scheduling in a communication system to provide a service to at least two user equipments comprises calculating a utility value for each user equipment by using a utility function whose differential height is varied depending on priority of each user equipment, and determining a user equipment, to which data will be transmitted at a specific time slot, among the at least two user equipments, by using the utility value of each user equipment.

In another aspect of the present invention, a network scheduler for determining a user equipment to which a service will be provided in a communication system comprises means for calculating a utility value for each user equipment by using a utility function whose differential height is varied depending on priority of each user equipment, and means for determining a user equipment, to which data will be transmitted at a specific time slot, among at least two user equipments, by using the utility value of each user equipment.

In still another aspect of the present invention, a method of controlling call admission of a new user equipment which enters a network in a communication system comprises determining whether to admit a call for the new user equipment considering scheduling of at least one user equipment which is previously receiving a service.

In further still another aspect of the present invention, a method of controlling call admission for a new user equipment which enters a network in a communication system comprises performing scheduling by giving a priority lower than that of a user equipment which is previously receiving a service to the new user equipment, and determining whether to admit a call for the new user equipment depending a result of scheduling for a certain time period.

In the method of controlling call admission, performing scheduling includes calculating a utility value for each user equipment by using a utility function whose differential height is varied depending on priority of each user equipment, and determining a user equipment, to which data will be transmitted at a specific time slot, among the at least two user equipments, by using the utility value of each user equipment.

Call admission of the new user equipment is determined if minimum QoS requirements of the new user equipment are satisfied for the certain time period. The minimum QoS requirements are minimum average data transmission rate requirements.

BEST MODE FOR CARRYING OUT THE INVENTION

Hereinafter, structures, operations, and other features of the present invention will be understood readily by the preferred embodiments of the present invention, examples of which are illustrated in the accompanying drawings.

Figure 1:
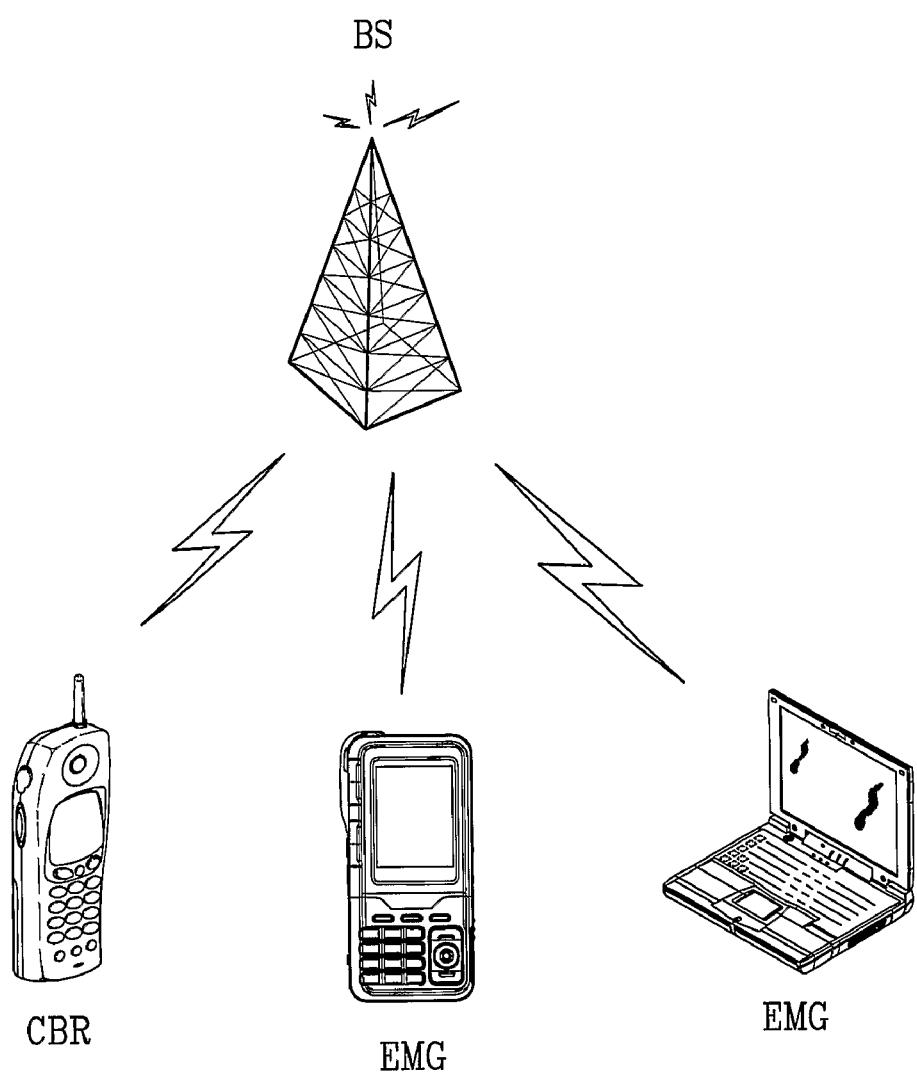
FIG. 1 is a schematic view illustrating a mobile communication system to which the present invention can be applied.

FIG. 1 is a schematic view illustrating a mobile communication system to which the present invention can be applied. The mobile communication system includes a network and a plurality of user equipments. In FIG. 1, a base station (BS) corresponds to an end point of the network and performs communication with the plurality of user equipments through a radio interface.

The plurality of user equipments can be classified into CBR user equipments and EMG user equipments depending on service types provided to the user equipments. An example of the CBR user equipment includes a voice user. Since voice is encoded uniformly at a constant average speed, a data transmission rate equal to the encoding speed of voice is required for the CBR user equipment. If data are assigned to the CBR user equipment at a transmission rate higher than the encoding speed, it could lead to waste of resources. An example of the EMG user includes a moving picture experts group-4 fine granularity scalability (MPEG-4 FGS) user. Multimedia encoded by MPEG-4 FGS should satisfy a minimum transmission rate for decoding, and images of better quality can be obtained if a transmission rate higher than the minimum transmission rate is assigned for the multimedia. Accordingly, the EMG user should be ensured by the minimum data transmission rate, and if remaining resource exists, it may additionally be assigned to the EMG user. In this case, the EMG user could be a general user who desires to use a premium service. Furthermore, the EMG user who has a minimum request rate of 0 could be an elastic user. If resource remains without separate minimum guarantee, it may be assigned to the elastic user. Hereinafter, the EMG user includes the elastic user unless specifically mentioned.

The following embodiments will be described based on a cellular mobile communication system which can be of service to only a user per certain time period, for example, per one time slot. Examples of the cellular mobile communication system include a HSDPA or a high data rate (HDR) system. It is to be understood that technical features of the present invention are not limited to the aforementioned cellular mobile communication system, but various modifications can be made within the range of the present invention depending on designer's intention.

In FIG. 1, a scheduler determines a user equipment, which will be provided a service at a specific time slot, among the plurality of user equipments. The scheduler is generally located in the base station, but its location is not limited to the base station. In other words, the scheduler may be located in a specific portion of the network connected with the base station. Although call admission control according to the present invention may be performed by the scheduler, it may be performed by another device inside the network or the base station. Embodiments of the method of controlling call admission according to the present invention will be associated with scheduling performed by the scheduler per certain time period.

Figure 2:
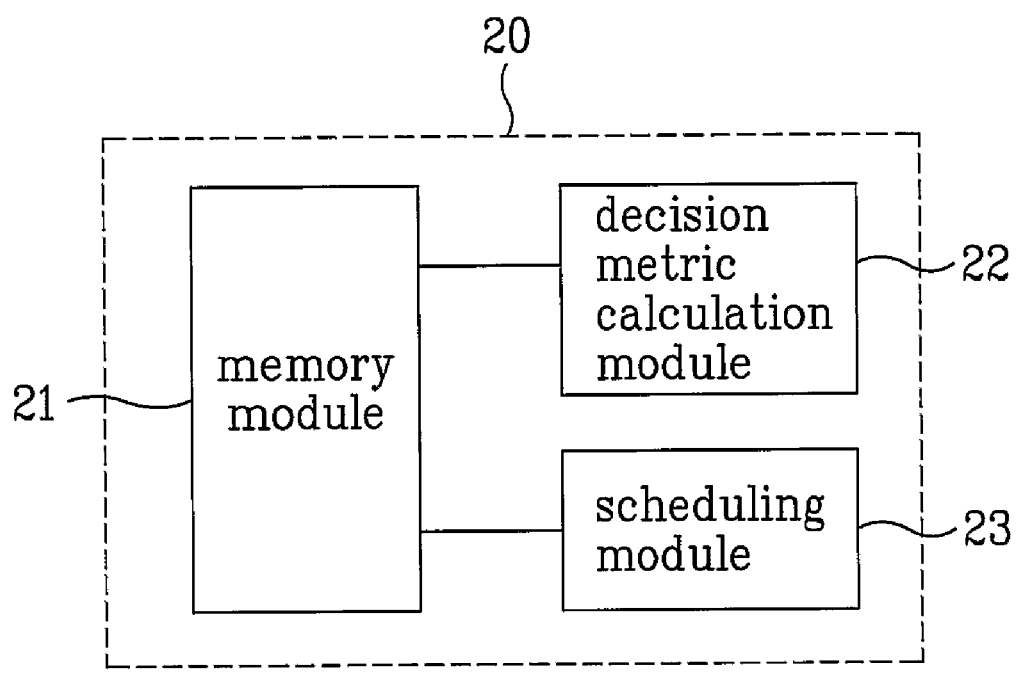
FIG. 2 is a block diagram illustrating a scheduler or an apparatus of controlling call admission according to the preferred embodiment of the present invention.

FIG. 2 is a block diagram illustrating the scheduler according to the preferred embodiment of the present invention. Referring to FIG. 2, the scheduler 20 includes a memory module 21 storing a utility function for each user and parameters such as a priority for each user, a minimum transmission rate requirement, etc., a decision metric calculation module 22 calculating a decision metric using the utility function for each user and the parameters stored in the memory module 21, and a scheduling module 23 selecting a user, to which data will be transmitted per time slot, using the decision metric for each user, which is calculated by the decision metric calculation module 22.

Supposing that a set of all users is S, and C and E are a set of CBR users and a set of EMG users, respectively, S=C∪E is made. Supposing that $R_i$ is an average transmission rate of a user i, the utility function $U_i$ for each user, which is stored in the memory module 20, is defined by the following equations 1 and 2 depending on whether a corresponding user is a CBR user or an EMG user.

$$U_i(R_i) = c_i \left\{ 1 - \frac{\log(1 + e^{-b(R_i - m_i)})}{\log(1 + e^{bm_i})} \right\} \quad \text{[Equation 1]}$$

$$U_i(R_i) = \begin{cases} c_i \left\{ 1 - \frac{\log(1 + e^{-b(R_i - m_i)})}{\log(1 + e^{bm_i})} \right\}, & R_i < m_i \\ a_i \log(1 + R_i - m_i) + \alpha_i, & R_i \geq m_i \end{cases} \quad \text{[Equation 2]}$$

$$\alpha_i = c_i \left\{ 1 - \frac{\log(2)}{\log(1 + e^{bm_i})} \right\}$$

In the above equations, $a_i$, $b_i$, $c_i$, $\Delta_i$ are positive constants, and $m_i$ is a minimum transmission rate requirement of the user i. $m_i^\delta$ is defined by $m_i + \delta_i$, wherein $\delta_i$ is either a positive constant of a very small quantity which may regard $m_i^\delta$ as 0, or 0 for the elastic user. $a_i$ and $c_i$ are constants determined by a priority of the user i, wherein $a_i$ has the same value for all EMG users. Also, $b_i$ has the same value for all users. The utility function defined by the equations 1 and 2 has features such as continuity and strict concavity.

Figure 3:
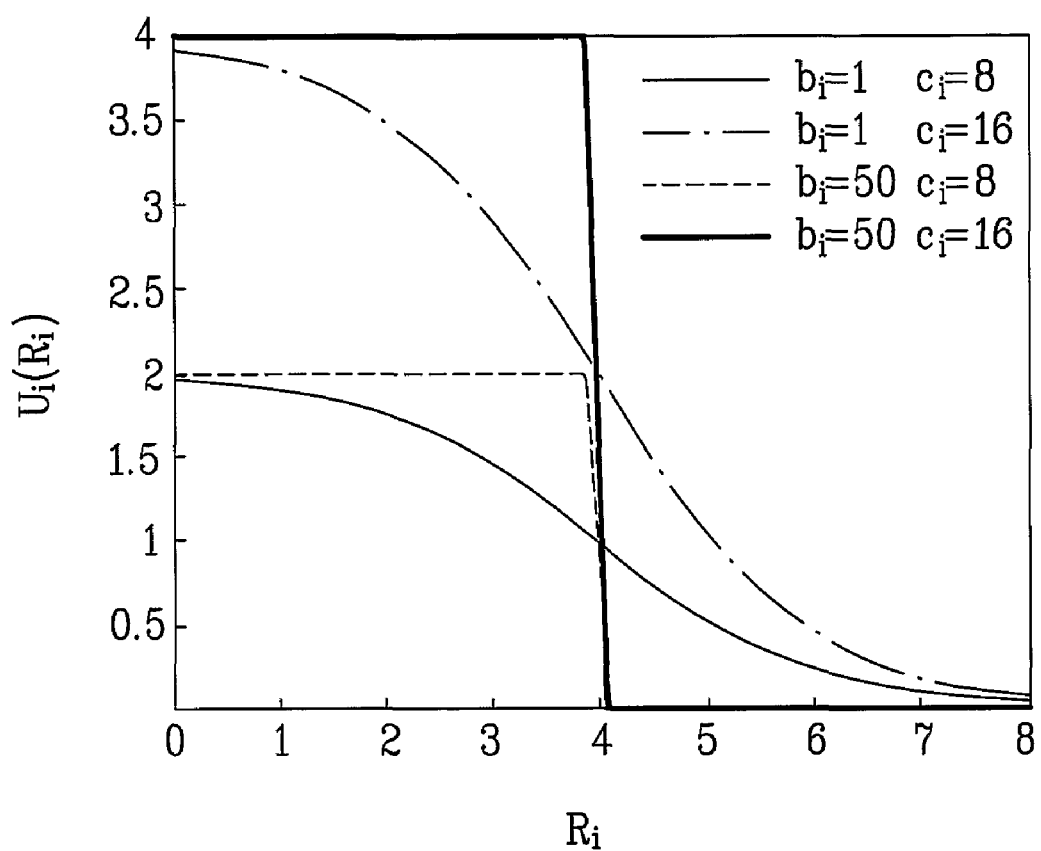
FIG. 3 is a diagram illustrating how a differential $U_i'(R_i)$ of a utility function defined by an equation 1 is varied depending on values $b_i$, $c_i$ in the preferred embodiment of the present invention.

FIG. 3 illustrates how a differential $U_i'(R_i)$ of the utility function defined by the equation 1 is varied depending on the values $b_i$, $c_i$. In all cases, $m_i=4$ is fixed. First, in case of $b_i=1$ and $c_i=8$, it is noted that $U_i'(R_i)$ is not rapidly decreased to 0 but slowly decreased even though the minimum requirement of 4 is exceeded. When $b_i$ is fixed and $c_i=16$ is made, it is noted that the height of $U_i'(R_i)$ becomes high but the utility function has similar features. By contrast, in case of $b_i=50$, $U_i'(R_i)$ is rapidly decreased if the minimum requirement of 4 is exceeded, the height of $U_i'(R_i)$ becomes high if the value $c_i$ is increased, and the height of $U_i'(R_i)$ becomes low if the value $c_i$ is decreased.

Accordingly, if it is set that the value $b_i$ is great enough, it is possible to control the height of the differential of the utility function $U_i'(R_i)$ while varying the value $c_i$ only. In this case, even though the value $c_i$ is varied, the feature of $U_i'(R_i)$ decreased to 0 remains unchanged if the minimum requirement is exceeded. Accordingly, it is easily noted that if $U_i'(R_i)$ is used for maximization of the utility function, $R_i$ will not exceed $m_i$. This feature of the utility function can be used for scheduling algorithm. The function defined by the equation 2 has the same features as those of the equation 1 excluding a part corresponding to $R_i \geq m_i^\delta$. According to these features, in the utility function defined by the equation 2, the part corresponding to $R_i \geq m_i^\delta$ is referred to as an elastic part, and a part corresponding to $R_i > m_i^\delta$ is referred to as an inelastic part.

In FIG. 2, as described above, parameters required for scheduling as well as the utility function for each user are stored in the memory module 21. Each user can be classified into a CBR user and an EMG user. Specifically, each user can be classified into a CBR user and an EMG user depending on QoS class. The QoS class can be defined for each user by whether each user is a CBR user or an EMG user, priorities, minimum average data transmission rate requirements, billing systems, etc.

As an example, the QoS class and its corresponding utility function can be expressed as $C_i(m_i, c_i, b_i)$, $E_i(m_i, c_i, b_i, a_i)$. For example, $C_1(10, 5, 50)$ means CBR class 1, and the utility function of the users belonging to the above class becomes a function defined by the equation 1 having $m_1=10$, $c_1=5$, $b_1=50$ as parameters.

The decision metric calculation module 22 calculates the decision metric for the users who are currently receiving the service, using the utility function for each user and the parameters, which are stored in the memory module 21. The decision metric is a utility value for each user to achieve maximization of a total of utility functions, and can be calculated by multiplication of a data transmission rate that can currently be provided to each user and a differential of the utility function for each user.

The data transmission rate that can be provided to each user can be determined depending on the minimum average data transmission rate requirement previously promised for each user. The minimum average data transmission rate requirement is a minimum requirement of an average data transmission rate to be provided to each user. If an average data transmission rate of some user at a specific timing slot is smaller than the minimum average data transmission rate requirement, the data transmission rate that can be provided to the user at the specific timing slot is increased.

The calculation of the decision metric using multiplication of the data transmission rate that can currently be provided to each user and the differential of the utility function for each user is only exemplary. The decision metric can be calculated by various methods to achieve maximization of a total of utility functions.

The scheduling module 23 determines a user to which data will be transmitted at a corresponding timing point (time slot), based on the decision metric for each user, which is calculated by the decision metric calculation module 22. For example, a user having the greatest multiplication of the data transmission rate that can currently be provided to each user and the differential of the utility function for each user may be determined as the user to which data will be transmitted at a corresponding timing slot. This can be expressed by the following equation 3.

$$i^* = \arg\max_i r_{i,t+1} U_i'(R_i(t))$$ [Equation 3]

In the above equation 3, $R_i(t)$ is an average transmission rate for the user i to reach a time t, and $r_{i,t+1}$ is a data transmission rate that can be provided to the user i. If the base station can transmit data to two or more users at a specific time slot, the scheduling module 23 may determine users to which the data will be transmitted at the corresponding time slot, in the order from the greatest decision metric to the smallest decision metric.

Figure 4A:
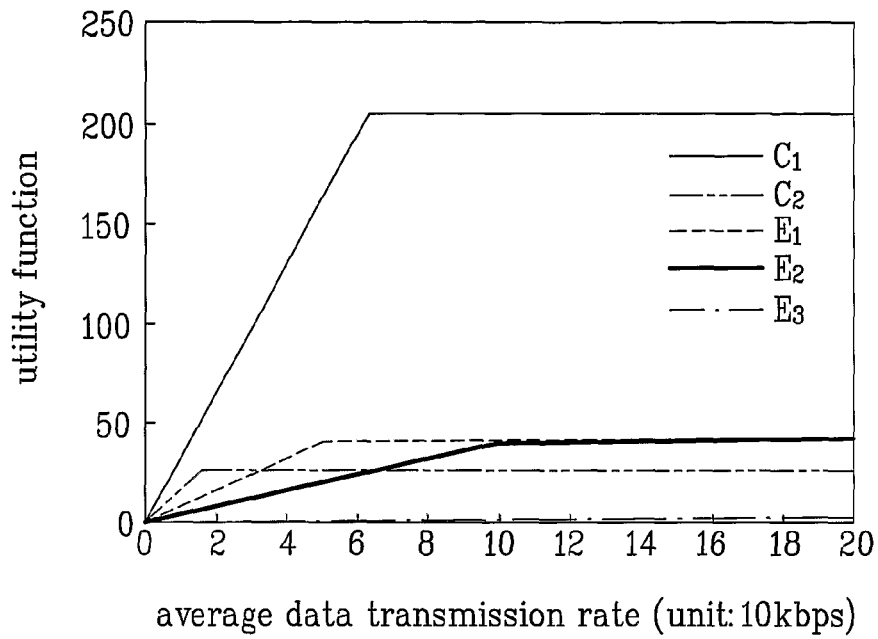
FIGS. 4A to 4C are diagrams illustrating a method of performing scheduling or controlling call admission according to the preferred embodiment of the present invention.
Figure 4B:
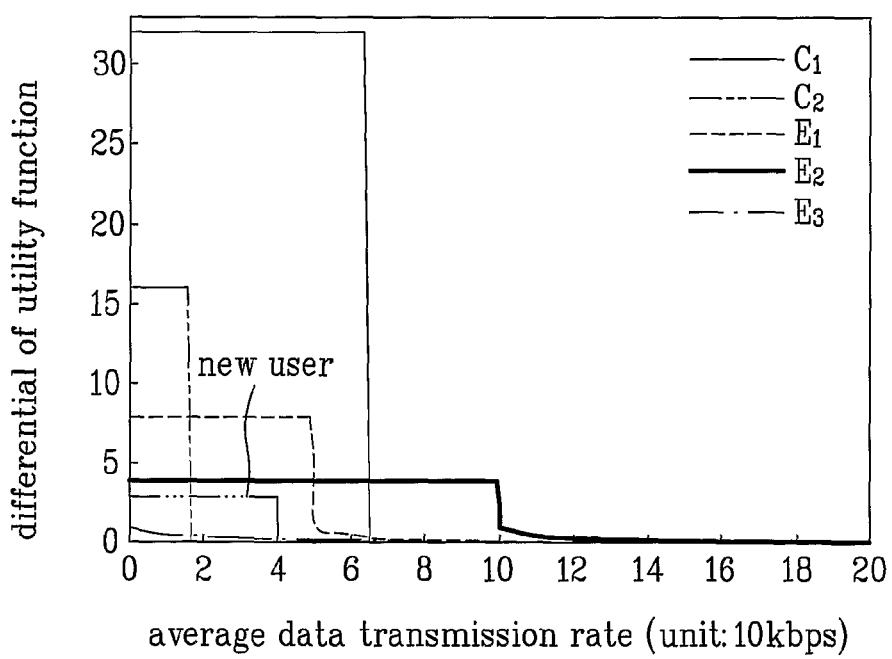
Figure 4C:
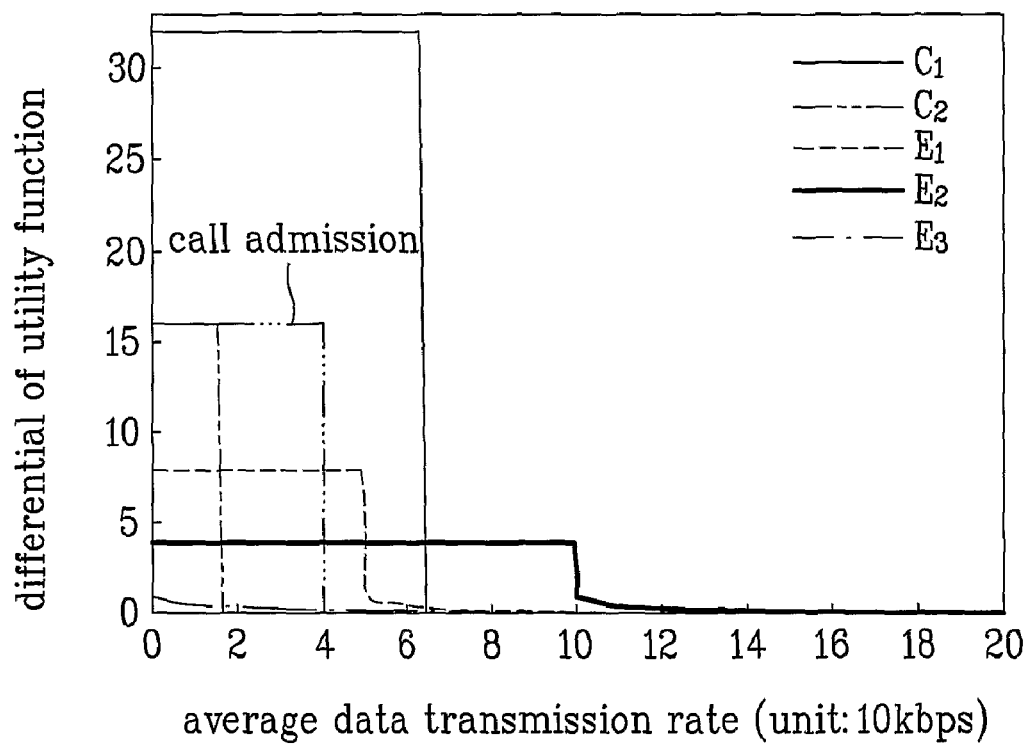

FIGS. 4A to 4C are diagrams illustrating a method of performing scheduling according to the decision metric or a method of controlling call admission according to the preferred embodiment of the present invention. Utility functions corresponding to $C_1(6.4, 204.8, 50)$, $C_2(1.6, 25.6, 50)$, $E_1(5, 40, 50, 1)$, $E_2(10, 40, 50, 1)$, $E_3(0, 0, 0, 1)$ and their differentials are shown in FIGS. 4A to 4C. In FIG. 4B, it is noted that the height of the differential of the CBR class 1 ($C_1$) is the highest. If the utility functions of FIG. 4B are used for maximization of the utility function, a resource (data transmission rate) will first be assigned to the CBR class 1. This is because that assignment of the resource to the CBR class 1 most greatly contributes to maximization of the utility function. Since the differential value is rapidly decreased to 0 if the average data transmission rate assigned to the CBR class 1 exceeds the minimum average data transmission rate requirement of 64 Kbps, the resource will not be assigned to the CBR class 1 any longer but be assigned to a CBR class 2 ($C_2$) having a second differential value which is high next to the highest differential value.

If the system capacity is enough, the resource will be assigned to the CBR class 1 so that the average data transmission rate reaches 64 Kbps, and the other resources will be assigned to the CBR class 2 which corresponds to the second priority. In this way, the resource continues to be assigned to the EMG class 2 ($E_2$) having the lowest differential value. After the EMG class 2($E_2$) is satisfied with the minimum requirement, if the remaining resource still exists, it will be shared among the EMG classes excluding the CBR classes. This is because that the differential of the utility function of each of the EMG classes is not rapidly decreased to 0 but slowly decreased even though the minimum average data transmission rate requirement is exceeded.

Considering the above factors, it is noted that the priority is determined in the order of $C_1 > C_2 > E_1 > E_2 > E_3$ depending on the height of the differential value. As described above, it is noted that the priority can be determined very readily for the classes because the height of the differential value can be controlled by the value $c_1$ only.

The data transmission rate that can be provided to the user i at a time slot (t+1) can be determined by the factors such as whether the minimum average data transmission rate requirement is provided to the user i, the priority, and the system capacity. For example, if the user i is the CBR user and the minimum average data transmission rate requirement of the user i is satisfied currently (time slot t), the data transmission rate that can be provided to the user i is 0 at the next time slot (t+1). If the minimum average data transmission rate requirement of the user i is not satisfied currently (time slot t), the data transmission rate that can be provided to the user i should be determined to satisfy the minimum average data transmission rate requirement. Preferably, the data transmission rate is preferably determined considering channel status for each user during scheduling. The channel status for each user can be identified in such a manner that each user checks CINR, BER, FER, etc. for a reference signal transmitted from the base station and feeds the checked result back.

If a new user k enters the network and requests call admission, the base station admits a call for the new user and provides the same service as that of the other users to the new user. In this case, the utility function of the new user has the lowest priority among the users who are currently given the service. Furthermore, if the minimum average data transmission rate requirement of the new user is $m_k$, $m_k$ is set as the utility function of the CBR user having $m_k$ as the minimum average data transmission rate requirement.

Referring to FIG. 4B, if a new user whose minimum average data transmission rate requirement is $m_k=40$ kbps arrives in the network, how the utility function is set to control call admission of the new user has been described. As shown in FIG. 4B, the utility function of the new user is set such that the differential values of the users who are currently receiving the service are always greater than the differential value of the new user in the range of the minimum requirement. Since the differential value of the utility function is related to the priority, the priority of the new user is set to be lower than the existing users.

According to the utility function defined by the equations 1 and 2, when the user k newly arrives in the network and requests call admission, it is proved that admission of the user k to the base station does not affect minimum performance of QoS for users who currently receive the service as far as the utility function of the user k satisfies $\beta_k U_k'(R_k) \leq \beta_i U_i'(R_i)$, for $R_i \leq m_i$ for all the QoS users i who currently receive the service. In this case, the CBR users and the EMG users except for the elastic users are commonly designated as the QoS users.

Accordingly, according to the above fact, minimum performance of the QoS users which currently receive the service will not be affected. On the other hand, since the differential value of the new user is higher than that of the elastic part of the existing user, the transmission rate at the elastic part of the existing user can be reduced by the new user. This is acceptable in view of properties of the EMG users. If the transmission rate of the new user satisfies the minimum average data transmission rate requirement after the lapse of a given time, the new user is completely admitted. If not so, the new user is blocked.

If the new user is completely admitted, as shown in FIG. 4C, the parameters are changed such that the utility function of the new user has a priority which is originally intended. For example, if a user belonging to $C_i(6.4, 204.8, 50)$ newly arrives in the network, the utility function corresponding to $C_n(6.4, 12.8, 50)$ is set such that the above new user has the lowest priority among the QoS users. If it is determined that the new user can completely be admitted after the lapse of a certain time period, the current utility function is changed to the utility function corresponding the original class $C_i(6.4, 204.8, 50)$. For another example, if a user belonging to $E_i(5, 40, 50, 1)$ newly arrives in the network, the utility function corresponding to $C_n(5, 10, 50)$ is of service to the user. Then, if it is determined that the new user can completely be admitted, the current utility function is changed to the utility function corresponding the original class $E_i(5, 40, 50, 1)$. Since call admission control determines only whether the minimum requirement of the user can be satisfied, the service is provided to the EMG users like the CBR users for the certain time period, i.e., test time period.

FIGS. 5A to 5E are diagrams illustrating a simulation result in homogeneous channels in the method of performing scheduling according to the preferred embodiment of the present invention. It is supposed that five classes $C_1(6.4, 204.8, 50)$, $C_2(1.6, 25.6, 50)$, $E_1(5, 40, 50, 1)$, $E_2(10, 40, 50, 1)$, and $E_3(0, 0, 0, 1)$ exist in a cellular mobile communication system for simulation and 20 users exist in each class. Utility functions and differentials corresponding to the classes are as shown in FIGS. 4A and 4B.

It is supposed that a transmission rate ($r_{i,\tau}$) that can be achieved for each time slot is given by Shannon bound as shown in Equation 4 below.

$$r_{i,\tau} = W\log_2\left(1 + \frac{S_i}{N_i}\right) \quad \text{[Equation 4]}$$

In the equation 4, W is a channel bandwidth, $S_i$ is intensity of a received signal, and $N_i$ is intensity of noise.

Figure 5A:
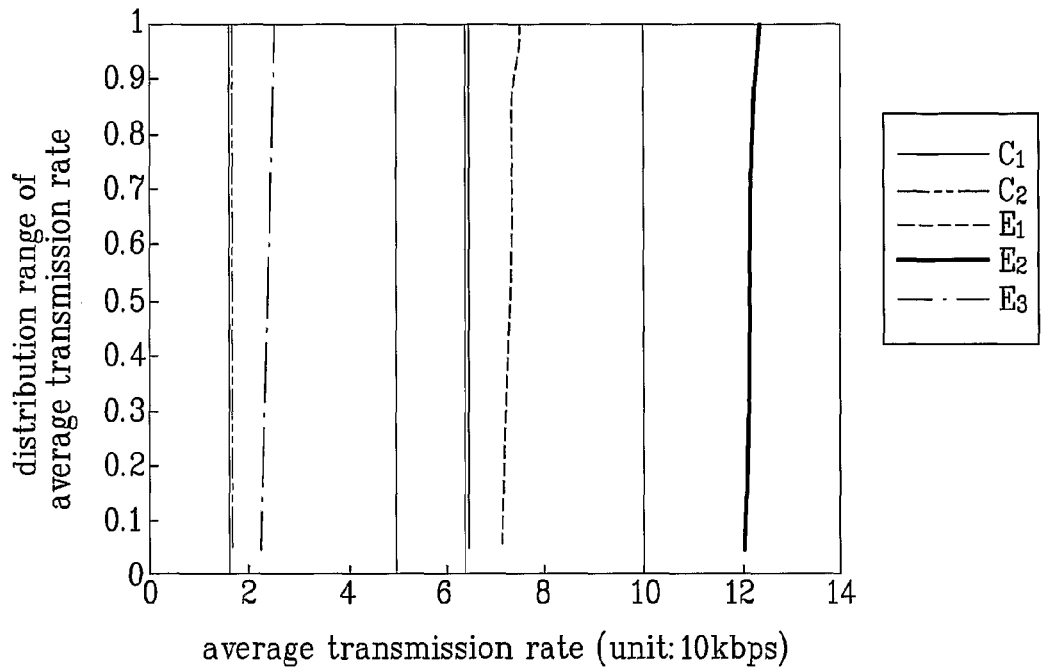
FIGS. 5A to 5E are diagrams illustrating a simulation result of a method of performing scheduling according to the present invention.
Figure 5B:
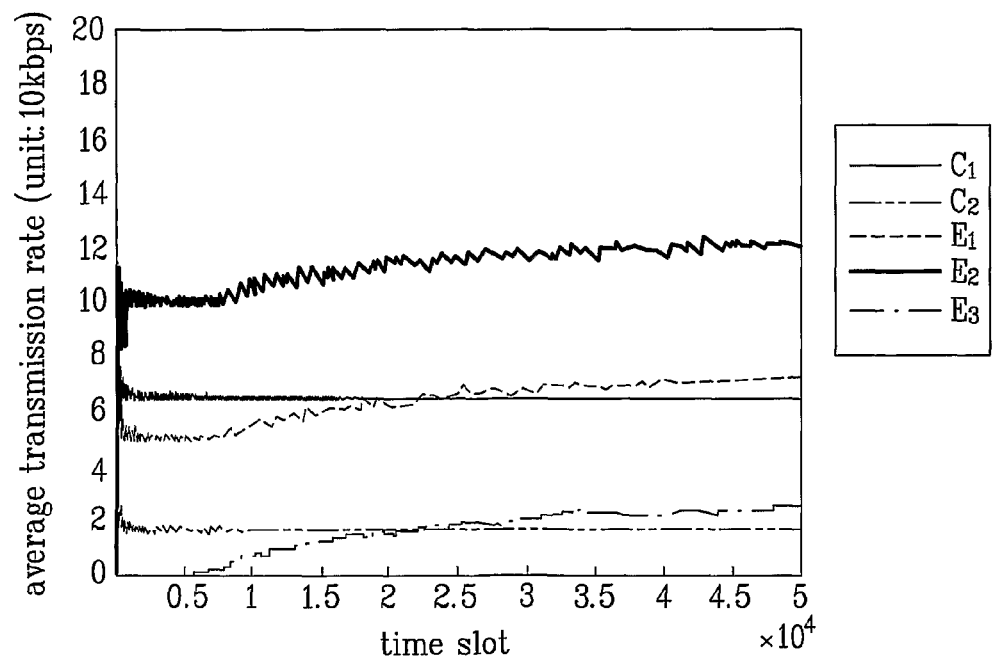

FIGS. 5A and 5B illustrate a distribution range of an average transmission rate of users and transition of an average transmission rate according to time when W=1 MHz is made. In FIG. 5A, it is noted that an average transmission rate of all users belonging to sets $C_1$ and $C_2$ of the CBR users almost exactly achieves the minimum average data transmission rate requirements of 64 kbps and 16 kbps. On the other hand, it is noted that the minimum requirement of users belonging to EMG classes $E_1$ and $E_2$ is basically satisfied and data almost corresponding to the minimum requirement are additionally provided to the users. It is also noted that the data additionally provided to the users are similar to the transmission rate of the elastic users belonging to EMG class $E_3$. In other words, it is noted that after the minimum requirement of all users is satisfied, the remaining resource is shared among the EMG users almost uniformly. FIG. 5B illustrates the average transmission rate according to time for users selected one to one from the respective classes. Referring to FIG. 5B, it is noted that the transmission rate of the CBR users is converged into the minimum average data transmission rate requirement. On the other hand, after the transmission rate of the EMG users is converged into the minimum average data transmission rate requirement, the remaining resource after the minimum requirement of all QoS users is satisfied is converged into the transmission rate of the EMG users.

Figure 5C:
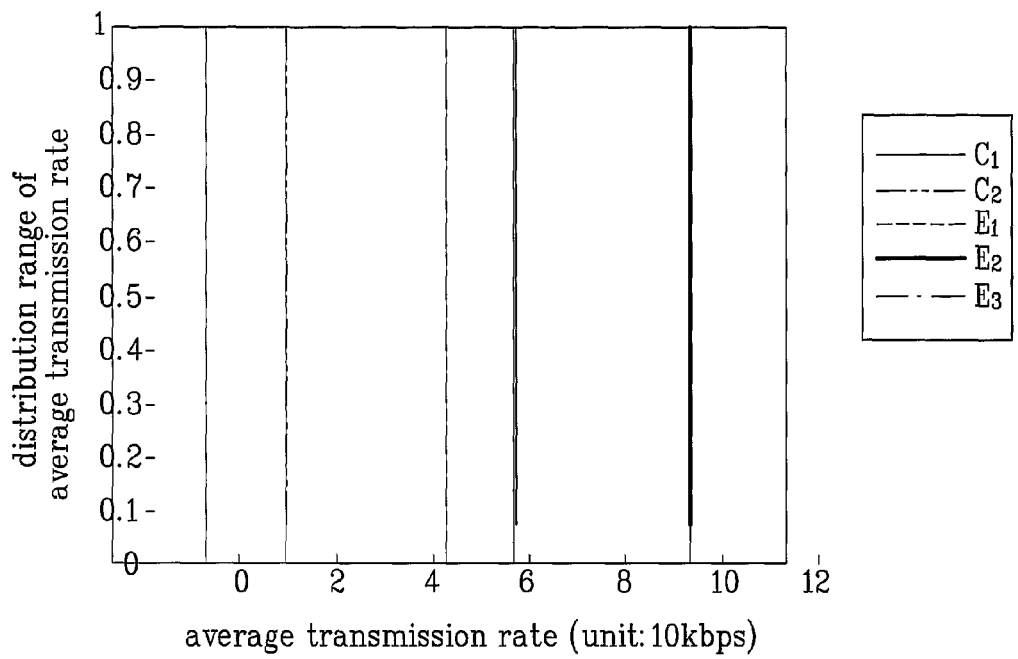
Figure 5D:
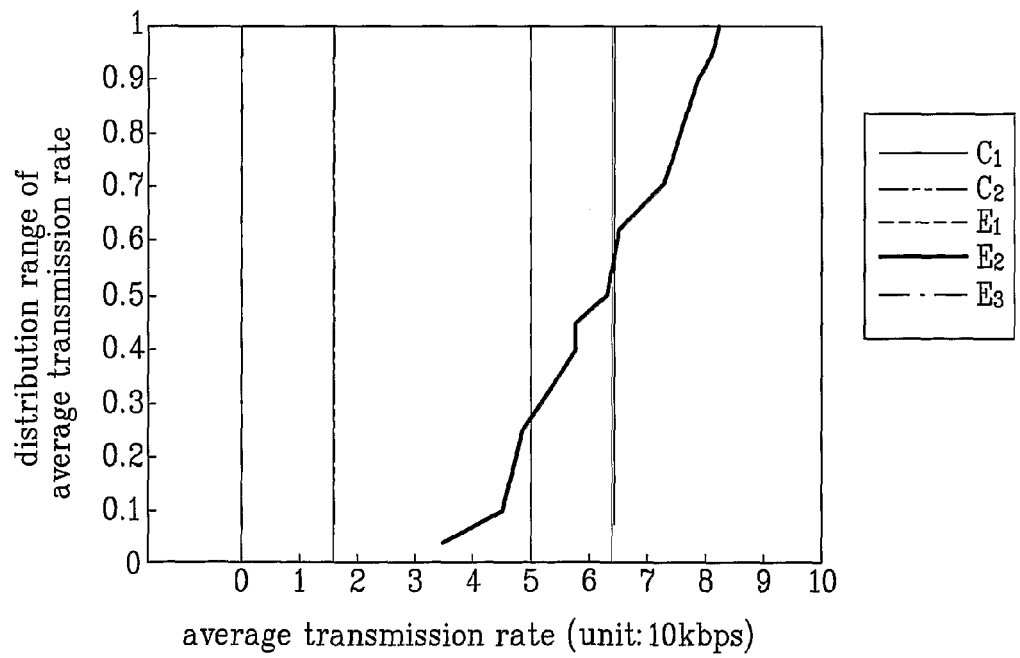
Figure 5E:
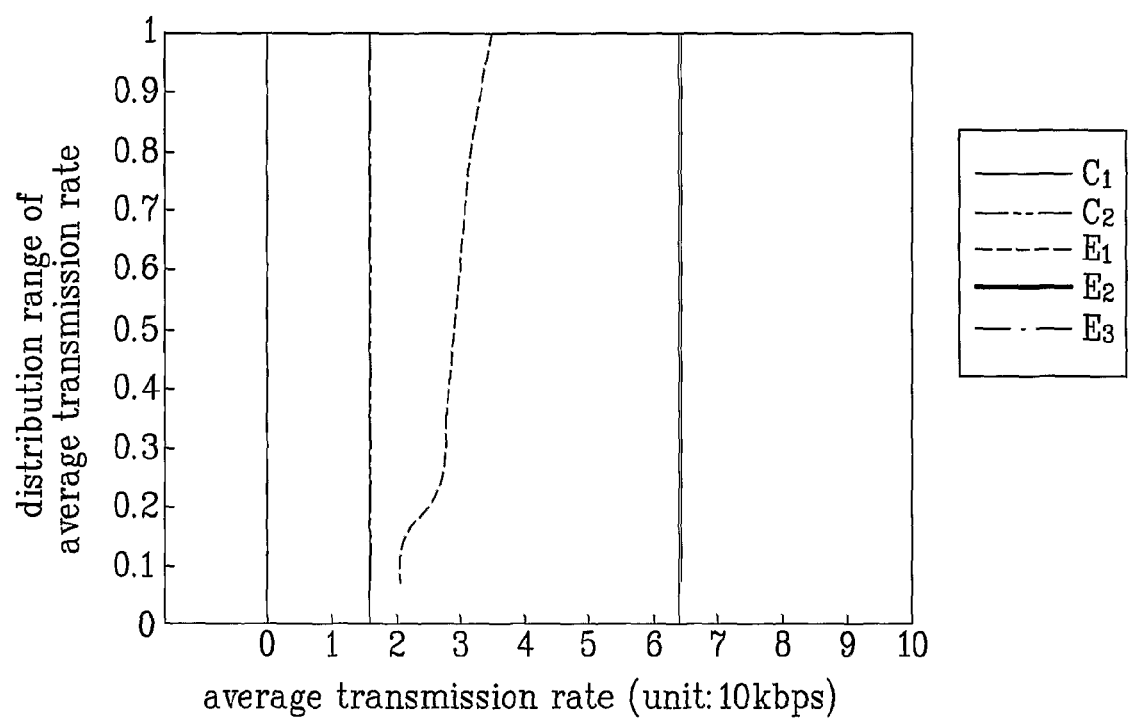

FIG. 5C illustrates a simulation result in a state that the system capacity is decreased by W of 0.8 MHz. As shown in FIG. 5C, it is noted that the minimum requirement of the QoS users is exactly ensured and all the elastic users belonging to $E_3$ obtain a transmission rate of 0. Accordingly, it is regarded that $E_3$ has the lowest priority. If W is decreased to 0.6 MHz, the result of FIG. 5D can be obtained. It is noted from FIG. 5D that the minimum requirement of $C_1$, $C_2$, $E_1$ is satisfied and the requirement of $E_2$ is not satisfied. Accordingly, it is regarded that $E_2$ has the second priority. Of course, it is noted that $E_3$ achieves a transmission rate of 0. FIG. 5E illustrates a result when W is defined as 0.3 MHz. It is experimentally noted that the priority $C_1 > C_2 > E_1 > E_2 > E_3$ previously expected is obtained as W continues to be decreased.

FIGS. 6A to 6D illustrate a simulation result in homogeneous channels in the method of controlling call admission according to the preferred embodiment of the present invention. A scenario was used in FIGS. 6A to 6D, in which users in simulation of FIGS. 5A to 5D exist as they are while new users continue to enter the network in the order of $C_1$, $C_2$, $E_1$, $E_2$, and $E_3$. In other words, the minimum average data transmission rate requirement of the users who enter the network becomes 64 kbps, 16 kbps, 50 kbps, 100 kbps, 64 kbps . . . . The new user first arrives in the network at the $10000^{th}$ time slot and then whether to admit the new user is determined after the lapse of 3000 time slot. Another new user again enters the network after the lapse of 100 time slot.

Figure 6A:
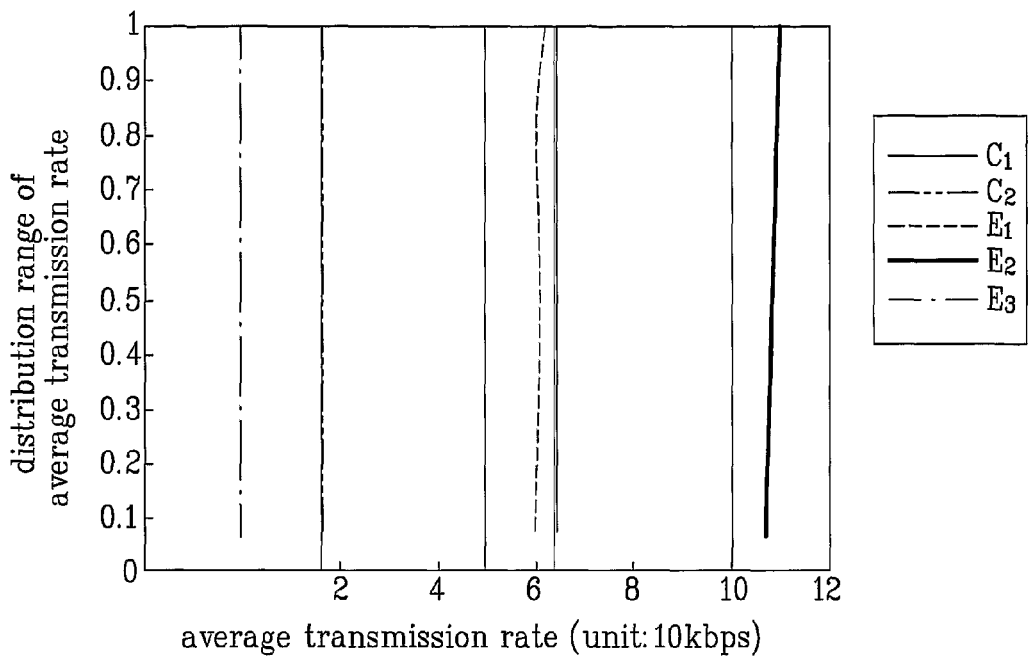
FIGS. 6A to 6D are diagrams illustrating a simulation result in homogeneous channels according to the preferred embodiment of the present invention.
Figure 6B:
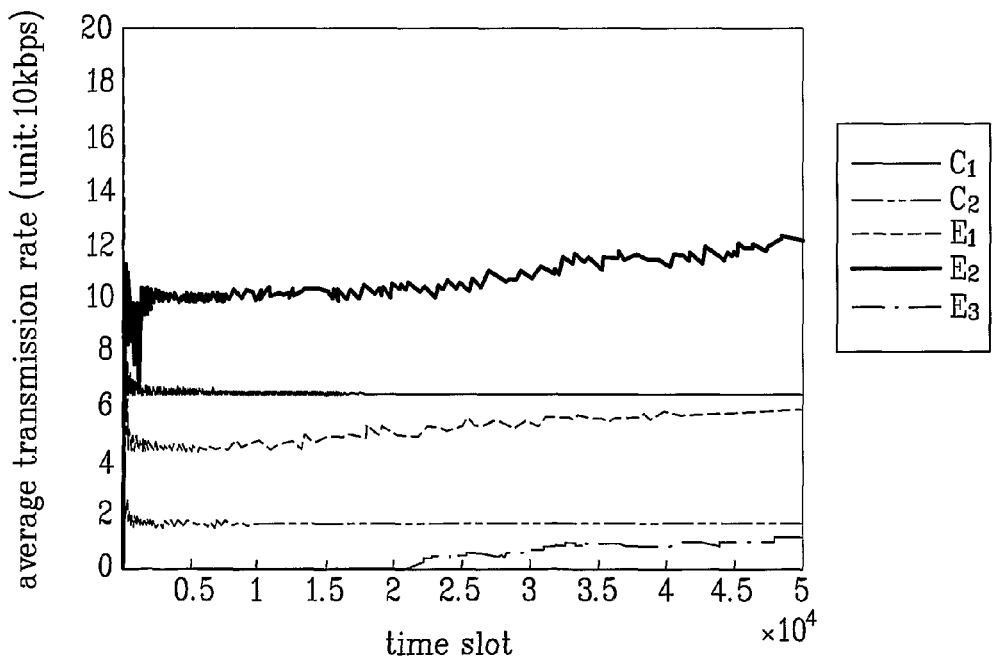

FIGS. 6A and 6B illustrate the result in a state that a new user does not enter the network in case of W=0.9 MHz. As shown in FIGS. 6A and 6B, the result of FIGS. 6A and 6B is similar to the previous result, and it is noted that the remaining resource exists as the EMG users receive data beyond the minimum requirement.

Figure 6C:
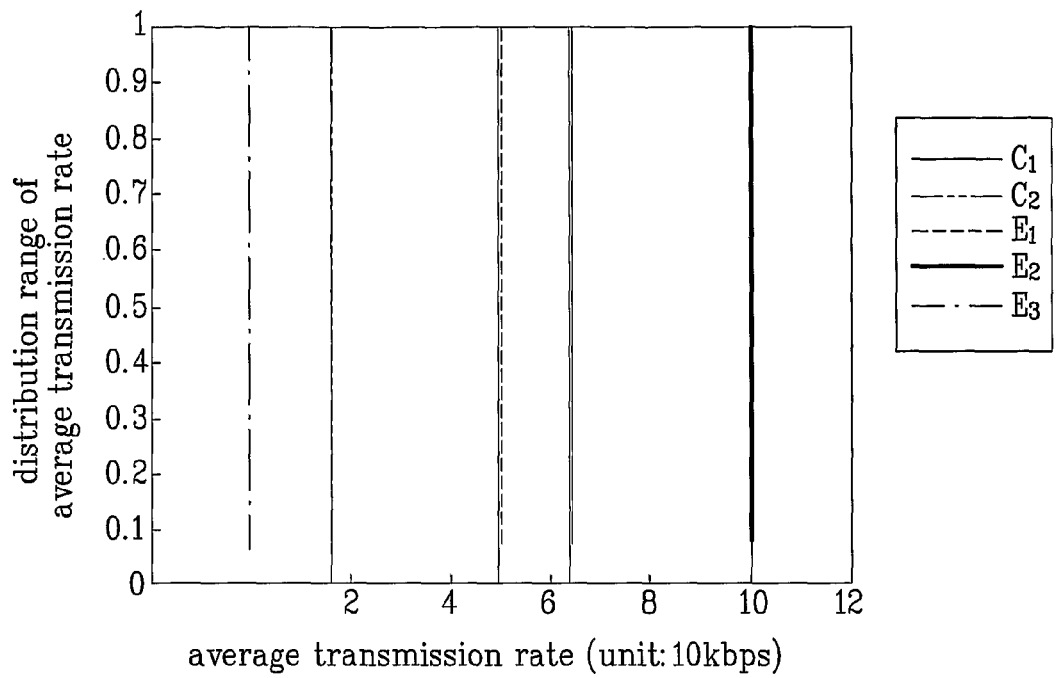

FIG. 6C illustrates distribution of an average transmission rate of the users including the result of the existing users and the result of the users admitted to enter the network through call admission test. It is noted from FIG. 6C that the minimum requirement of all QoS users is exactly satisfied. Accordingly, it is regarded that the call admission algorithm according to the present invention maintains feasibility of user's requirement. Also, the following factors should be considered: 1) can maximum users be admitted to enter the network while maintaining feasibility?; and 2) does not a test for determining whether new users are admitted to enter the network affect performance of the existing QoS users?

Figure 6D:
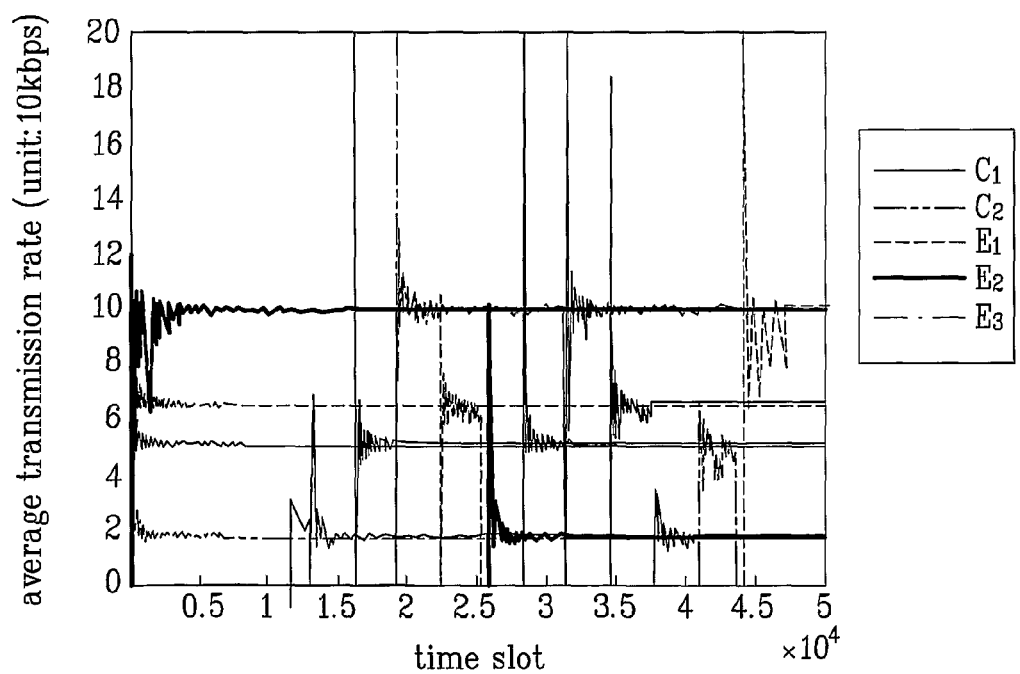

Referring to FIG. 6D, it is noted that the minimum performance of the existing users remains unchanged even though a new user enters the network to undergo a test. In FIG. 6D, it is noted that the user who first arrives in the network is not admitted while the next users continue to be admitted and then the fifth user and the eleventh user are not admitted. It is assumed that the first user is not admitted because the first user enters the network in a state that performance of the existing user does not satisfy the minimum requirement. Under the circumstances, if the user enters the network, no service is provided to the user. It is noted that no resource is assigned to the first user for 1500 time slots after the first user enters the network. The reason why the fifth user is not admitted is different from that why the first user is not admitted. It is assumed that the fifth user is not admitted because convergence of the average transmission rate of the fifth user is a little delayed considering that the ninth user who requests the same minimum transmission rate as that of the fifth user has homogenous channels to those of the fifth user. In other words, the fifth user is not admitted because a test time period was not enough to allow the average transmission rate to converge. To verify such an assumption, the test was carried out supposing that the first to eighth users were regarded as the existing users. As a result, it was noted that the minimum requirement was satisfied. Also, the test was carried out supposing that the first to ninth users were regarded as the existing users. As a result, it was noted that feasibility was not maintained.

Accordingly, it is noted that the method of controlling call admission according to the present invention allows maximum users while maintaining feasibility. To increase accuracy as to whether to admit the users, the test time period may increase to obtain a sufficient time period for convergence of the average transmission rate of the new users. However, in this case, time delay will increase in determining whether to admit the users. In other words, since tradeoff occurs among the factors, the test time period, accuracy and time delay, a service provider should set the factors appropriately considering various relations.

The method of performing scheduling in a communication system and the method of controlling call admission according to the present invention have the following advantages.

First, differential service quality can be provided to each user depending on priority and QoS class having the minimum average data transmission rate requirement.

Second, since a wireless Internet system such as WiBro can provide various applications which require QoS, various business models can be obtained.

Third, various service quality classes can be provided to the users depending on the given priority even though the users' request cannot be satisfied due to decrease of network capacity caused by change of the channel status. Also, the user can select the service suitable for its taste among various services.

Finally, since the present invention can easily be applied to wired Internet as well as wireless Internet, various business models can be provided to wired Internet providers.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to wired and wireless communication systems such as a wired or wireless internet system and a mobile communication system.

The invention claimed is:

1. A method of performing scheduling in a communication system to provide a service to at least two user equipments, the method comprising:
    calculating a utility value for each user equipment of the at least two user equipments by using a utility function whose differential height varies depending on a priority of each user equipment; and
    determining a user equipment, to which data will be transmitted at a specific time slot, among the at least two user equipments, by using the utility value of each user equipment,
    wherein the utility function of a constant bit rate (CBR) user equipment which requires a minimum average data transmission rate is:

$$U_i(R_i) = c_i \left\{ 1 - \frac{\log(1 + e^{-b(R_i - m_i)})}{\log(1 + e^{bm_i})} \right\},$$

wherein $R_i$ is an average transmission rate of a user i,
    wherein b and $c_i$ are positive constants,
    wherein $m_i$ is a minimum transmission rate requirement of the user i, and
    wherein the differential height of the utility function is set higher for a user equipment whose priority is higher.

2. The method of claim 1, wherein calculating the utility value for each user equipment further comprises multiplying a data transmission rate that can be provided to each user equipment at the specific time slot and the differential height of the utility function for each user equipment.

3. The method of claim 2, wherein determining the user equipment to which data will be transmitted at the specific time slot comprises determining a user equipment having the greatest utility value among the at least two user equipments.

4. The method of claim 1, wherein the utility function of an elastic with minimum guarantee (EMG) user equipment which requires the minimum average data transmission rate and includes a preference to receive data at a transmission rate greater than the minimum average data transmission rate when the transmission rate is greater than the minimum average data transmission rate is:

$$U_i(R_i) = \begin{cases} c_i \left\{ 1 - \frac{\log(1 + e^{-b(R_i - m_i)})}{\log(1 + e^{bm_i})} \right\}, & R_i < m_i \\ a_i \log(1 + R_i - m_i) + \alpha_i, & R_i \geq m_i \end{cases}$$

$$\alpha_i = c_i \left\{ 1 - \frac{\log(2)}{\log(1 + e^{bm_i})} \right\},$$

wherein $a_i$ is a positive constant.

5. The method of claim 1, wherein determining the user equipment to which data will be transmitted at the specific time slot comprises considering a channel status of each user equipment.

6. A network scheduler for performing scheduling in a communication system to provide a service to at least two user equipments, the scheduler comprising:
    a decision metric calculation device configured to calculate a utility value for each user equipment of the at least two user equipments by using a utility function whose differential height varies depending on a priority of each user equipment; and
    a scheduling device configured to determine a user equipment, to which data will be transmitted at a specific time slot, among the at least two user equipments by using the utility value of each user equipment,
    wherein the utility function of a constant bit rate (CBR) user equipment which requires a minimum average data transmission rate is:

$$U_i(R_i) = c_i \left\{ 1 - \frac{\log(1 + e^{-b(R_i - m_i)})}{\log(1 + e^{bm_i})} \right\},$$

wherein $R_i$ is an average transmission rate of a user i,
    wherein b and $c_i$ are constants,
    wherein $m_i$ is a minimum transmission rate requirement of the user i, and
    wherein a differential height of the utility function is set higher for a user equipment whose priority is higher.

7. The scheduler of claim 6, wherein the utility value for each user equipment is calculated by multiplying a data transmission rate that can be provided to each user equipment at the specific time slot and the differential height of the utility function for each user equipment.

8. The scheduler of claim 7, wherein a user equipment having the greatest utility value among the at least two user equipments is determined as the user equipment to which data will be transmitted at the specific time slot.

9. The scheduler of claim 6, wherein the utility function of an elastic with minimum guarantee (EMG) user equipment which requires the minimum average data transmission rate and includes a preference to receive data at a transmission rate greater than the minimum average data transmission rate when the transmission rate is greater than the minimum average data transmission rate is:

$$U_i(R_i) = \begin{cases} c_i \left\{ 1 - \frac{\log(1 + e^{-b(R_i - m_i)})}{\log(1 + e^{bm_i})} \right\}, & R_i < m_i \\ a_i \log(1 + R_i - m_i) + \alpha_i, & R_i \geq m_i \end{cases}$$

$$\alpha_i = c_i \left\{ 1 - \frac{\log(2)}{\log(1 + e^{bm_i})} \right\},$$

wherein $a_i$ is a positive constant.

10. The scheduler of claim 6, wherein the user equipment to which data will be transmitted at the specific time slot is determined by considering a channel status of each user equipment.

* * * * *